(12) United States Patent
Kim et al.

(10) Patent No.: US 7,580,978 B2
(45) Date of Patent: Aug. 25, 2009

(54) METHOD OF INTERMEDIATING MULTICASTING SIGNAL FOR MULTICASTING EMBODIMENT

(75) Inventors: Yong-Hwa Kim, Incheon-shi (KR); Hyun-Je Park, Gyeonggi-do (KR)

(73) Assignee: EGC & C Co., Ltd. (KR)

( * ) Notice: Subject to any disclaimer, the term of this patent is extended or adjusted under 35 U.S.C. 154(b) by 636 days.

(21) Appl. No.: 10/674,848

(22) Filed: Sep. 29, 2003

(65) Prior Publication Data

US 2004/0073612 A1      Apr. 15, 2004

Related U.S. Application Data

(63) Continuation of application No. PCT/KR02/00561, filed on Mar. 29, 2002.

(30) Foreign Application Priority Data

Mar. 30, 2001   (KR)   ............................ 2001/17038
May 3, 2001     (KR)   ............................ 2001/24144

(51) Int. Cl.
*G06F 15/16* (2006.01)
(52) U.S. Cl. ........................ 709/205; 709/227
(58) Field of Classification Search ............... 370/389, 370/390, 392, 431, 486, 487; 709/245, 278
See application file for complete search history.

(56) References Cited

U.S. PATENT DOCUMENTS 4,688,108 A    8/1987   Cotton et al.
4,878,242 A   10/1989   Springer et al.
5,373,316 A   12/1994   Ishinabe et al.

(Continued)

FOREIGN PATENT DOCUMENTS

EP           0 254 591           1/1988

(Continued)

OTHER PUBLICATIONS

William W. Plummer, Internet Broadcast Protocols, Jul. 3, 1977, IEN#10, section 3.*

(Continued)

*Primary Examiner*—Yasin M Barqadle
(74) *Attorney, Agent, or Firm*—Knobbe Martens Olson & Bear LLP

(57) ABSTRACT

The invention relates to a multicasting relay method to secure a significantly increased number of simultaneous multicasting connectors under an identical network environment (B-RAS, NAS or the like) with no addition of service device under a modem environment utilizing xDSL and PSTN and a recording medium readably by a computer recorded with programs, the method comprising the steps of: prompting a contents providing server to induce the first xDSL connector terminal to an xDSL server (B-RAS) (step 1); broadcasting a multicasting broadcasting data to the xDSL connector server in real time (step 2); discriminating whether a relevant xDSL ser§ice device supports the multicasting (step 3); broadcasting the multicasting broadcasting data to the first xDSL connector terminal in real time and prompting the xDSL service device to receive the broadcasting data at a multicasting address (step 4); and relaying multicasting data to the second xDSL connector terminal from the xDSL service device of the relevant xDSL server (step 5).

13 Claims, 12 Drawing Sheets

U.S. PATENT DOCUMENTS

| | | | |
|---|---|---|---|
| 5,764,279 A | 6/1998 | Ford et al. | |
| 6,020,915 A | 2/2000 | Bruno et al. | |
| 6,097,720 A * | 8/2000 | Araujo et al. | 370/355 |
| 6,138,144 A * | 10/2000 | DeSimone et al. | 709/204 |
| 6,181,697 B1 * | 1/2001 | Nurenberg et al. | 370/390 |
| 6,411,616 B1 * | 6/2002 | Donahue et al. | 370/352 |
| 6,417,933 B1 | 7/2002 | Szurkowski | |
| 6,539,022 B1 * | 3/2003 | Virgile | 370/401 |
| 6,683,887 B1 * | 1/2004 | Huang et al. | 370/466 |
| 6,751,218 B1 * | 6/2004 | Hagirahim et al. | 370/390 |
| 6,810,413 B1 * | 10/2004 | Rajakarunanayake et al. | 709/203 |
| 6,931,005 B1 * | 8/2005 | Wilhelm | 370/390 |
| 7,245,614 B1 * | 7/2007 | Podar et al. | 370/389 |
| 2001/0012304 A1 * | 8/2001 | Agraharam et al. | 370/487 |
| 2001/0018714 A1 * | 8/2001 | Yagyu et al. | 709/245 |
| 2001/0026556 A1 * | 10/2001 | Yagyu et al. | 370/432 |
| 2002/0097742 A1 * | 7/2002 | Chen | 370/463 |
| 2003/0053458 A1 * | 3/2003 | Okazaki | 370/390 |

FOREIGN PATENT DOCUMENTS

| | | |
|---|---|---|
| EP | 0 563 594 | 10/1993 |
| EP | 0 642 270 | 3/1995 |
| EP | 0 851 652 | 7/1998 |
| JP | 1-157659 | 6/1989 |
| JP | 5-276508 | 10/1993 |
| JP | 10-200638 | 7/1998 |
| JP | 11-149448 A | 6/1999 |
| JP | 11-252072 A | 9/1999 |
| JP | 11-313059 A | 11/1999 |
| JP | 11-338796 | 12/1999 |
| KR | 2000-0050176 A | 8/2000 |
| WO | WO 97/09826 A1 | 3/1997 |
| WO | WO 99/49717 A | 10/1999 |

OTHER PUBLICATIONS

VISI, UNIX man pages: rsh(1).*

Juan-Mariano de Goyeneche, Multicast over TCP/IP HOWTO, Mar. 20, 1998.*

Deering, Host Extensions fro IP Multicasting, RFC 1112, p. 3.*

* cited by examiner

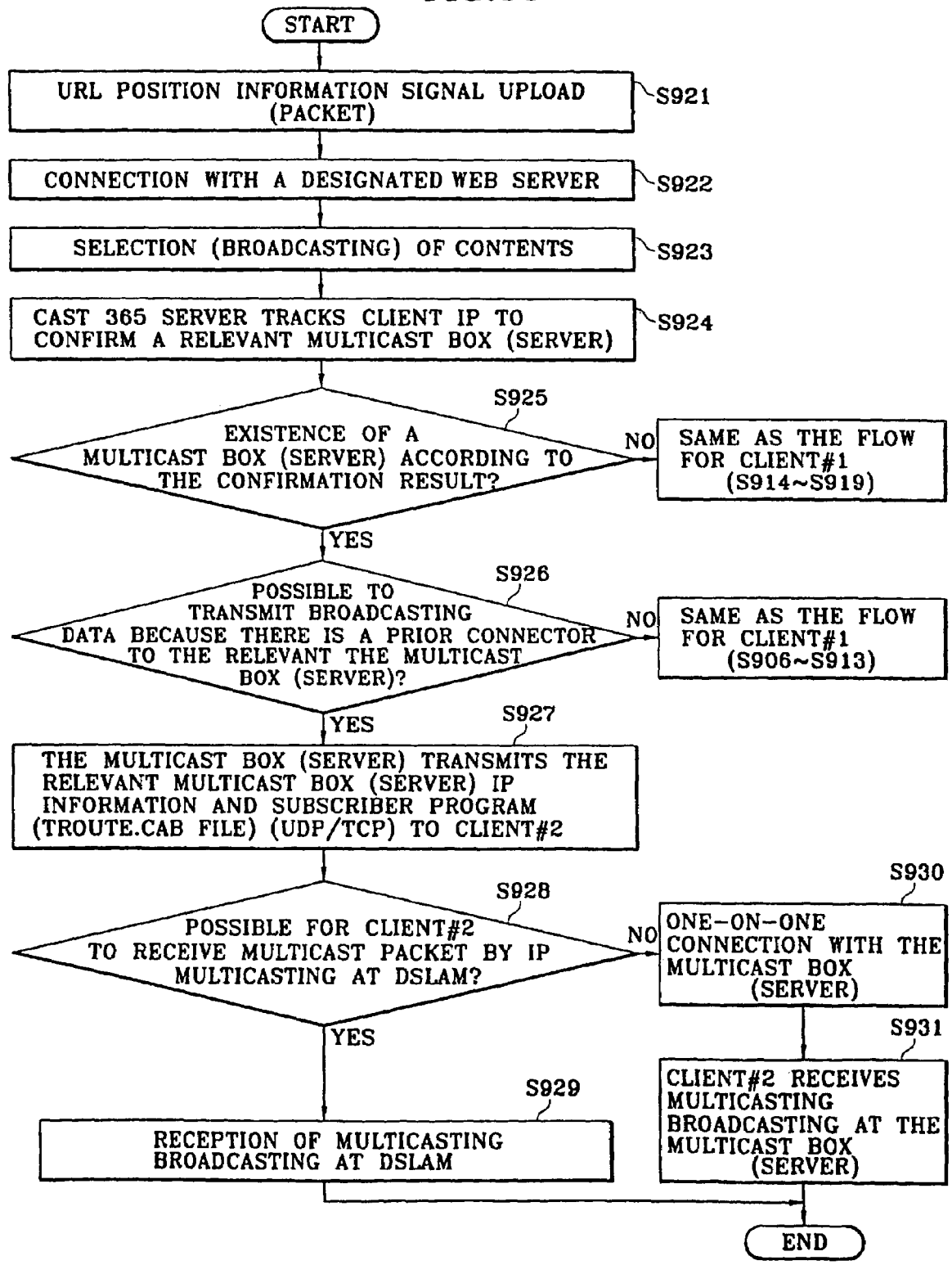

US 7,580,978 B2

METHOD OF INTERMEDIATING MULTICASTING SIGNAL FOR MULTICASTING EMBODIMENT

RELATED APPLICATIONS

This application is a continuation under 35 U.S.C. § 365 (c) claiming the benefit of the filing date of PCT Application No. PCT/KR0200561 designating the United States, filed Mar. 29, 2002. The PCT Application was published in English as WO 02/080456 A1 on Oct. 10, 2002, and claims the benefit of the earlier filing date of Korean Patent Application Nos. 2001/17038, filed Mar. 30, 2001 and 2001/24144 filed May 3, 2001. The contents of the Korean patent applications and the international application including the publication WO 02/080456 A1 are incorporated herein by reference in their entirety.

BACKGROUND OF THE INVENTION

1. Field of the Invention

The present invention relates to a multicasting technological field of an internet broadcasting system, and more particularly to a multicasting relaying method to achieve a multicasting under a modem environment utilizing a digital subscriber line (xDSL) and a public switch telephone network (PSTN) and a recording mechanism that can read a program to achieve the aforementioned method with a computer.

2. Brief Description of the Prior Art

An xDSL is a new transmission technology to provide a high-speed data transmission by using an upper band, a unused frequency band of a general telephone network, still guaranteeing the use of a conventional plain old telephone service (POTS).

Basically, the frequency bandwidth (transmission capacity) and modulation technique of analog signals determine how fast digital signals can be transmitted to analog signals.

The xDSL technology is a method by which the digital transmission speed can be improved by enlarging an analog bandwidth of a telephone network to solve a problem of narrow bandwidth, a problem of the conventional telephone line. In theory, the telephone network can be used to transmit analog signals having a bandwidth greater than 4 KHz, which is a voice bandwidth. However, the higher the transmission speed gets, the shorter the transmission distance is. The quality of the telephone network should be good. Accordingly, a variety of transmission speeds and transmission techniques have been developed according to transmission distance and transmission speed applied fields.

The xDSL is a generic name applied for several types of digital subscriber line techniques, including: asymmetric digital subscriber line (ADSL); symmetric digital subscriber line (SDSL); high-bit-rate digital subscriber line (HDSL); rate adaptive asymmetric digital subscriber line (RADSL); very high-bit-rate digital subscriber line (VDSL) and the like, providing high-speed multi-media services such as video on demand (VoD), high-speed internet connection, remotely controlled education and video phone by using the conventional telephone line.

However, a centralized server providing internet broadcasting programs generally transmits multimedia data to all users' terminals connected thereto. A plurality of internet users are connected with an internet broadcasting server, which provides internet broadcasting programs, to receive and appreciate all the broadcasting data, for instance, various multimedia data like moving pictures and audio data. In other words, according to an internet broadcasting system that has been used up to now, all the users are to be connected with a central server having a large capacity of an internet broadcasting server regardless of the number thereof.

As the development of multimedia technologies has been accelerated, the data transmission capacity gets greater to frequently cause a bottleneck phenomenon of communications or break down of internet services.

Particularly, the competitiveness of internet broadcasting programs depends on the superiority in the quality of images and sound. An increase in the data transmission capacity is indispensable for securing a competitive edge. Therefore, in order to provide high quality internet broadcasting services, it is inevitable to improve the function and capacity of the server. However, it is impossible in reality to make an endless improvement in the function and capacity of the broadcasting systems to satisfy demands of many internet broadcasting viewers.

Besides, if a server is connected by a number of users at one time, it is almost impossible to allow another user to get connected with the server in spite of superiority in its function and capacity. Even if another user gets connected with the server, there may be a problem in that the data transmission speed becomes too slow to see quality broadcasting.

In general, a data transmission on the internet is made through TCP/IP (Transmission Control Protocol/Internet Protocol).

In order to carry out an internet broadcasting through TCP/IP or a user datagram protocol (UDP), an identical data must be transmitted to several terminals by repeating same as many numbers as the number of terminals.

In order to solve the aforementioned problem, 'IP multicasting' is used. The IP multicasting is an internet reference standard specifically set up for broadcasting multimedia data such as simultaneous visual images or audio sounds through the internet. In other words, the IP multicasting is an internet protocol to set a specific address range labeled 'Class D' as an internet standard established to broadcast on the internet multimedia data like moving pictures and audio data and to transmit data to all terminals having the same address that fall in the specific internet address range labeled 'Class D' when one of the terminals sharing the same address sends data only once.

However, if an internet router connected with the terminal does not support the IP multicasting, the IP multicasting can be used only in a local area network (LAN) with which the terminal is in connection. Particularly, a terminal gets connected with an internet server by passing through a plurality of internet routers. At this time, if any of the routers does not support the IP multicasting, a terminal cannot receive broadcasting data from the internet server.

Furthermore, since internet routers designed to support IP multicasting are not sufficiently distributed, the internet broadcasting cannot be made by using IP multicasting in actuality. Therefore, it is rare to provide broadcasting services on the internet by using the IP multicasting. The IP multicasting is applied only to the intranet system of some enterprises. At present, most of internet broadcasting servers utilize TCP/IP or UDP, instead of the IP multicasting, for a direct connection between servers and terminals to transmit and receive broadcasting data. However, in the broadcasting mechanism, it is very difficult to make an increase in the number of users who can get connected with the server because there will be an extremely high communication load on the server. In other words, if a great number of users get connected to an internet broadcasting server, there may be a communication overload causing problems such as poor accessibility, data loss, low communication speed, server breakdown and high cost for construction of a system since it is necessary to use a very high functional server.

In order to solve the aforementioned problems, there should be a method for providing a quality internet broadcast to a plurality of users without a bottleneck phenomenon by allowing data to be relayed from a connected terminal to other ones. Moreover, there should be a method for restricting the number of terminals that can be directly connected with a server to thereby continuously provide internet broadcasting without the server breakdown even when there are a great number of users demanding an internet connection at the same time.

Preferably, description will be made on a method for expanding such a multicasting data dispersion environment (LAN environment) into a modem environment out of communication networks utilizing the xDSL and the PSTN.

In general, when ADSL or PSTN is used, data will be conveyed to a final network connector through the following procedure: Contents Providing server (CP), Internet Data Center (IDC), Internet Communication Service Provider (ISP); ADSL server (B-RAS); Asynchronous Transfer Mode (ATM) switch; ADSL Service Mechanism (DSLAM); a plurality of users or Contents Providing server (CP); Networking Storing Mechanism (NAS); Public Switch Telephone Network (PSTN); modem; and user (refer to FIG. 5).

In case of ADSL and PSTN, a method for connecting a user is similar following the steps of B-RAS and NAS. Therefore, description will be made mainly with ASDL hereinafter.

Generally, a connection network of ADSL through DSLAM is a network installed by an ADSL service provider through an analysis on the number of service users, the quantity of transmitting data, the required cost and the like to provide services to process upload 1 Mbps and download 8 Mbps at the same time. However, ADSL services have been provided for upload 10~60 Kbps and download 300 Kbps in actuality. Recently, there have emerged a few service providers that are partly operated with download 1 Mbps.

In the system thus described, approximately 1000~2000 users utilize each DSLAM and, if a cable modem is used with services provided by Dreamline, Thrunet or Hanaro, a device that has the same function as a Cable Modem Terminal System (CMTS) is used for services like an internet connection. However, if the DSLAM does not support multicasting, it can receive a signal only by a unicasting method with a limitation in the simultaneous access that can be made only within a given upload and download allotment capacity.

In order to overcome such a limitation, an IP multicasting method by way of Peer-to-Peer (P-to-P) method of an IP multicasting technique is used as an attempt to increase the number of simultaneous connectors. It has been well-known that the aforementioned method is a system for increasing the number of simultaneous connectors by relaying broadcasting data as upload while a particular client is listening to the same broadcasting.

However, in the aforementioned multicasting technique using the P-to-P method, a network capacity for transmitting upload data is restricted to 600 K per DSLAM at present (approximately 1 M at some services). Supposed the upload data capacity were 600 Kbps and one client transmitted upload signals of 150 K, it can be well known that two clients' upload signals are tied into one packet and taken as upload data. However, if the network capacity assigned for upload data is taken into consideration (in other words, the data capacity is supposed as 600 K), the upload packet of 150 K can be transmitted only to 4 clients at an identical DSLAM in the P-to-P method at the same time. If simultaneous connectors actually perform such a packet transmission in the multicasting technique using the P-to-P method at the same DSLAM, it becomes impossible for the other service users of the same DSLAM to make an upload transmission, thereby resulting in a state where an ADSL connection becomes impossible to be made.

Besides, there are not only the technical limitations as such, but also theoretical limitations on the number of the simultaneous connectors. If a particular ADSL service provider is taken into account in reality, approximately 33 B-RAS accommodate ADSL services for about 17 billion users. At this time, assuming that only ASDL users may get a simultaneous connection with the same broadcasting program, it can be estimated that about 50,000 users are connected to each B-RAS. If about one thousand users are connected with each DSLAM, about 50 DSLAM may be installed for one B-RAS. Thus, if there are 33 B-RAS, it can be predicted that about 1,650 DSLAMs are in operation. When one DSLAM takes upload 150 K for each of 4 users, there may be a first receiver for each DSLAM and two receivers by 4 upload users, that is, 3 receivers if the 300 Kbps of broadcasting data is transmitted in the P-to-P method by utilization of the total system resource. It is a limited system that allows simultaneous connections for approximately 4,950 users. (where, each DSLAM upload capacity is 600 K.)

In other words, some developers have made efforts to get a network reduction effect by simultaneously transmitting upload 150 K of another user in the P-to-P method in combination with an initial upload 150 K of a user. In the aforementioned method, if each of two users utilizes 150 K, the maximum number of simultaneous multicasting system connectors for each DSLAM is 7 with an assumption that the upload limitation of each DSLAM is 2 Mbps. When it is taken into consideration that there are 33 B-RAS possessed by the largest ADSL service provider (Korea telecom), it can be predicted that there is a physical limitation that the number of simultaneous connectors cannot exceed 11,550 if only ADSL users make a simultaneous connection to the multicasting relay of a particular internet broadcasting organization. In case of some ADSL services, the upload data capacity is regarded as about 600 K to the maximum level, there is exposed an extreme limitation that only 4,950 users can be simultaneously connected by 300 K stream provided that the maximum number of simultaneous connectors for each DSLAM is 3 and the total number of B-RAS is 33. As a result, there is a barrier that prevents expansion of multicasting in the Internet broadcasting organizations.

Therefore, it is required to develop a method to perform multicasting data dispersing and processing operations under a modem environment utilizing xDSL and PSTN.

SUMMARY OF THE INVENTION

The present invention is thus disclosed to meet the aforementioned demand and it is an object of the present invention to provide a plurality of users with a quality internet broadcast without a bottleneck phenomenon by prompting one connected terminals relay data to other terminals.

It is another object of the present invention to continuously provide internet broadcasting without breakdown of a server, even if there are many users demanding simultaneous connections by limiting the number of terminals directly connected with the server.

Particularly, it is still another object of the present invention to provide a multicasting relay method that can secure a significant increase in the number of simultaneous multicasting connectors under a modem environment utilizing xDSL and PSTN (That is, under the same network environment (B-RAS, NAS, etc.) with no addition of other service devices) and a recording mechanism that can read with a computer a program to achieve the aforementioned method.

In order to accomplish one of the aforementioned objects of the present invention, there is provided a multi-casting relay method under a digital subscriber line (xDSL) environment, the method comprising the steps of:

prompting a contents providing server to Induce a first xDSL connector terminal to a xDSL server (B-RAS) to which the first xDSL connector terminal belong when the first digital subscriber line (xDSL) connector gets an access to the contents providing server to select a desired contents (step 1);

prompting the contents providing server to broadcast a multicasting ta to the xDSL server in real time (step 2);

discriminating whether xDSL service device belonging to the xDSL server can support a multicasting broadcast (step 3);

prompting the xDSL server to broadcast the multicasting data to the first xDSL connector terminal in real time and receive the broadcasting data from the first xDSL connector terminal at a multicasting address if the xDSL service providing equipment supports the multicasting broadcast as a result of the discrimination at the prior step (step 4); and prompting the contents providing server to induce a second xDSL connector terminal to a xDSL server (B-RAS) to which the second xDSL connector terminal belongs, when the second xDSL connector gets an access, after completion of the prior step, and to relay the multicasting data from a xDSL service device belonging to a relevant xDSL server to the second xDSL connector terminal (step 5).

In order to accomplish one of the aforementioned objects of the present invention, there is provided a multicasting relay method under a digital subscriber line (xDSL) environment, the method comprising the steps of:

prompting a contents providing server to track a first xDSL connector internet address and discriminate the existence of a multicast box (server) moving along with a xDSL server (B-RAS) to which the first xDSL connector belongs when a digital subscriber line (xDSL) connector is connected with the contents providing server to select a desired contents (step 1);

prompting the contents providing server to transmit multicasting data to a relevant multicast box (server) in real time (step 2);

prompting the multicast box (server) to make a multicasting data transmission command to the first xDSL connector terminal (step 3); prompting the first xDSL connector terminal to make a multicasting attempt to a xDSL service device of the xDSL server according to the multicasting data transmission command (step 4);

prompting the multicast box (server) to broadcast multicasting data through the xDSL service device to the first xDSL connector terminal in real time when the xDSL service device supports multicasting data as a successful result of step 4 (step 5); and prompting the contents providing server to induce the second xDSL connector terminal to a multicast box (server) moving along with a xDSL server (B-RAS) to which the second xDSL connector terminal belongs, when the second xDSL connector gets an access, after completion of step 5, and to relay multicasting data to the second xDSL connector terminal through xDSL service device of a relevant xDSL server (step 6).

In order to accomplish one of the aforementioned objects of the present invention, there is provided a multicasting relay method under a modem environment, the method comprising the steps of:

prompting the contents providing server to induce a modem connector terminal to a server (NAS) to which the modem connector terminal belongs if a modem connector gets an access to a contents providing server to select a desired contents (step 1);

prompting the contents providing server to broadcast a multicasting data to a server (NAS) in real time (step 2); and prompting the server to broadcast the multicasting data to the modem connector terminal one-on-one in real time (step 3).

In order to accomplish one of the aforementioned objects of the present invention, there is provided a recording medium readable by a computer recorded with programs for realizing a set of functions for:

prompting a contents providing server to induce a first xDSL connector terminal to a xDSL server (B-RAS) to which the first xDSL connector terminal belongs if a first digital subscriber line (xDSL) connector gets an access to the contents providing server to select a desired contents (first function);

prompting the contents providing server to broadcast a multicasting data to the xDSL server in real time (second function);

discriminating whether xDSL service device belonging to the xDSL server supports the multicasting data (third function);

prompting the xDSL service device to broadcast the multicasting data to the first xDSL connector terminal in real time and the xDSL service device to receive the broadcasting data from the first xDSL connector terminal at a multicasting address if the xDSL service device supports the multicasting data according to the discrimination result of the third function (fourth function); and prompting the contents providing server to induce the second xDSL connector terminal to a xDSL server (B-RAS) to which the second xDSL connector terminal belongs, when the second xDSL connector gets an access, after completion of the fourth function, and relay the multicasting data from xDSL service device belonging to a relevant xDSL server to the second xDSL connector terminal (fifth function).

In order to accomplish one of the aforementioned objects of the present invention, there is provided a recording medium readable by a computer recorded with programs for realizing a set of functions for:

prompting a contents providing server to track an internet address of the first xDSL connector and confirm the existence of a multicast box (server) subsequently moving along with xDSL server (B-RAS) to which the first xDSL connector belongs when a digital subscriber line connector gets an access to a contents providing server to select desired contents (first function);

prompting the contents providing server to transmit a multicasting data to a relevant multicast box (server) in real time (second function);

prompting the multicast box (server) to make a multicasting data transmission command to the first xDSL connector terminal (third function); prompting the first xDSL connector terminal to make a multicasting attempt to xDSL service device belonging to the xDSL server according to the multicasting data transmission command (fourth function);

prompting the multicast box (server) to broadcast the multicasting data through the xDSL service device to the first xDSL connector terminal in real time when the xDSL service device supports multicasting data as a result of the successful attempt of function 4 (fifth function); and prompting the contents providing server to induce the second xDSL connector terminal to the multicast box (server moving along with a xDSL server (B-RAS) to which the second xDSL connector terminal belongs when the second xDSL connector gets an access after completion of the fifth function, and the multicast box (server) to relay the multicasting data through xDSL service device of a relevant xDSL server to the second xDSL connector terminal (sixth function).

In order to provide one of the aforementioned objects of the present invention, there is provided a recording medium readable by a computer recorded with programs for realizing a set of functions for:

prompting the contents providing server to induce the modem connector terminal to a server (NAS) to which the modem connector terminal belongs (first function);

prompting the contents providing server to broadcast a multicasting data to the server (NAS) in real time (second function); and prompting the server (NAS) to broadcast the multicasting data to the modem connector terminal one-on-one in real time (third function).

The present invention has advantages such as reducing bottleneck phenomenon, which may be caused in an internet broadcasting system transmitting a large capacity of multimedia data, by using a hierarchical transmission network, and, more particularly, achieving a dispersing and processing environment of multicasting data under a modem environment utilizing xDSL basis and PSTN, that is, securing the greatly increased number of simultaneous multicasting connectors under an identical network environment (B-RAS, NAS and the like) by installing a multicast box embedded with multicasting signal relay algorithm in the B-RAS.

BRIEF DESCRIPTION OF THE DRAWINGS

Objects and aspects of the invention will become apparent from the following description of preferred embodiments with reference to the accompanying drawings in which:

FIGS. 9a, 9b and 9c are detailed flow charts for illustrating a multicasting method in accordance with an embodiment of the present invention.

DETAILED DESCRIPTION OF THE INVENTION

The aforementioned object, characteristics and advantages will be more apparent with the accompanying drawings and the related detailed description. Hereinafter, a preferred embodiment of the present invention will be described in detail.

Figure 1:
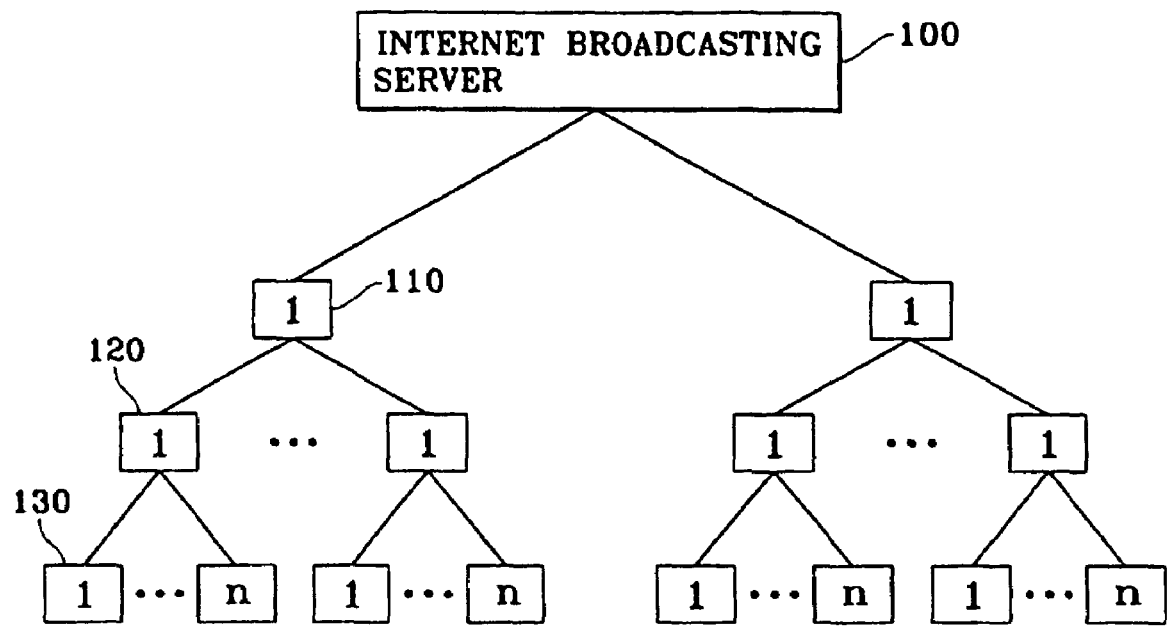
FIG. 1 illustrates a general structure of an internet broadcasting system using hierarchical data transmission in accordance with the present invention.
Figure 2:
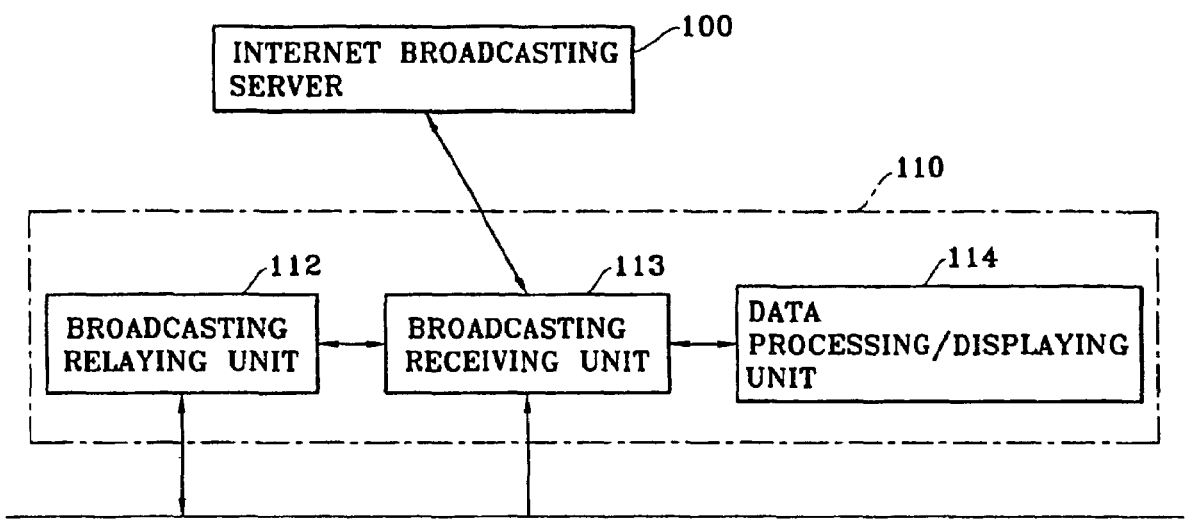
FIG. 2 illustrates a structure of a terminal used for an internet broadcasting system in accordance with the present invention.
Figure 3:
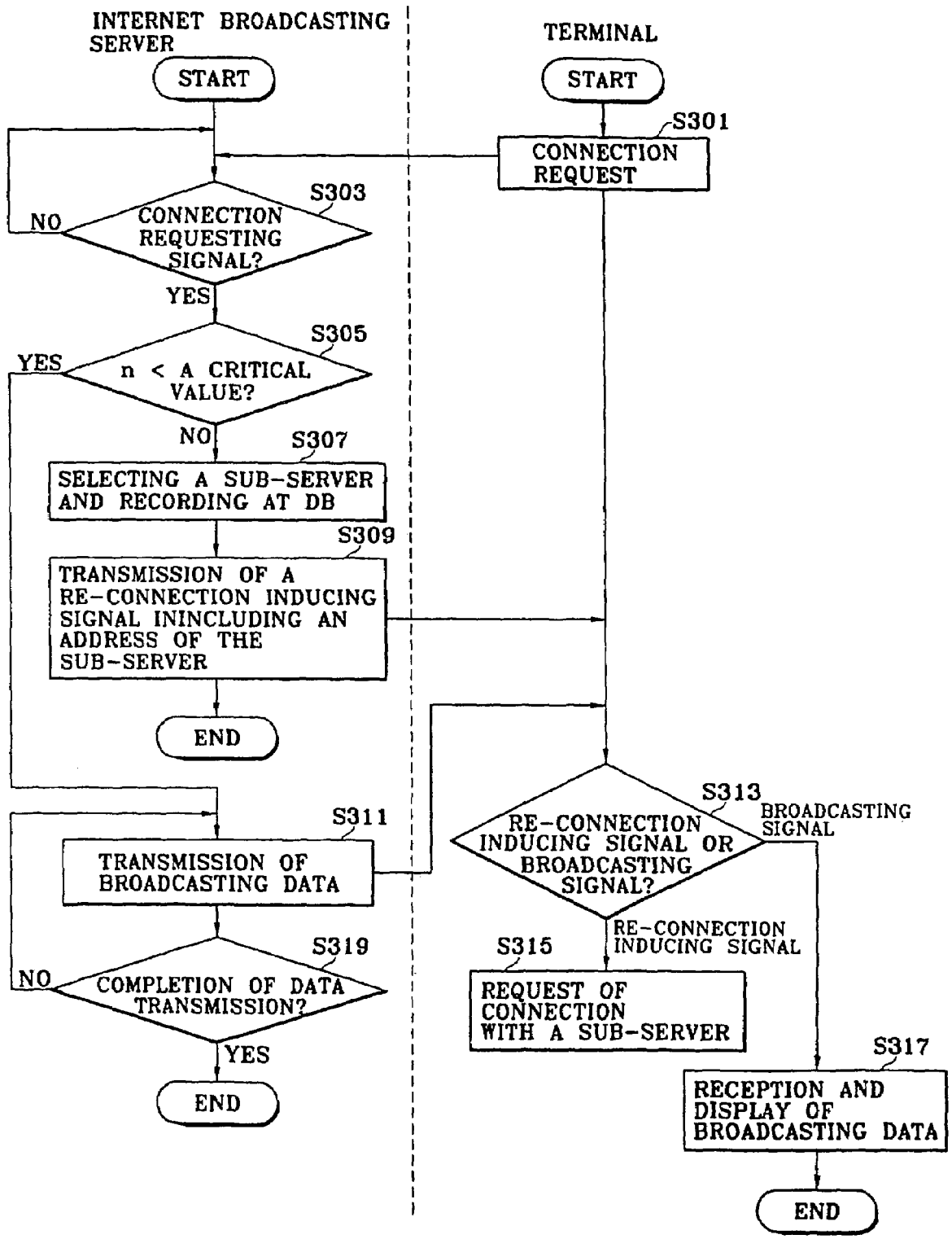
FIG. 3 is a flowchart for an internet broadcasting method using a hierarchical transmission in accordance with an embodiment of the present invention.
Figure 4:
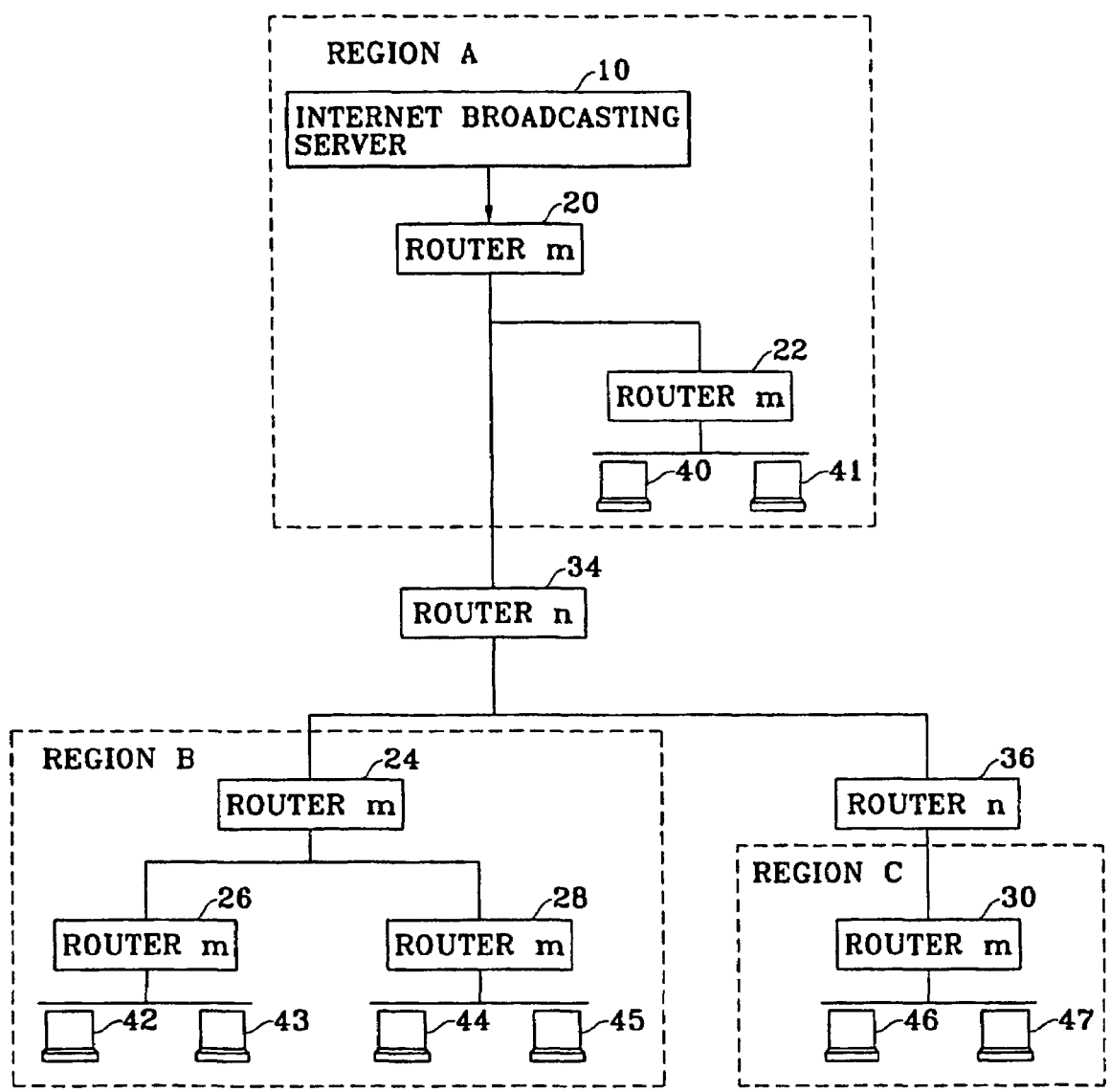
FIG. 4 illustrates a network structure of an internet broadcasting system using a dispersion IP multicasting method in accordance with an embodiment of the present invention.

First of all, description will be made on an internet broadcasting system and its related method using a hierarchical structure without any consideration about used protocols (FIGS. 1, 2 and 3). Then, an internet broadcasting system and its related method for transmitting data by using IP multicasting will be also described (FIG. 4). A further detailed description will be made on a method for achieving a multicasting system under a modem environment utilizing xDSL and PSTN (FIGS. 5, 6, 7, 8 and 9).

FIG. 1 illustrates a general structure of an internet broadcasting system using a hierarchical data transmission in accordance with the present invention, including: an internet broadcasting server 100 to provide broadcasting multimedia data like moving pictures and audio data; and a plurality of terminals 110, 120, 130 connected to the internet broadcasting server 100 or other servers for receiving data and prompting users view the data.

In order to further clarify the aforementioned description about the present invention, it can be defined that the terminals directly connected to an internet broadcasting server 10 are primary connection terminals 110, the ones connected to the primary connection terminals secondary connection terminals 120, the ones connected to the N-1$^{th}$ connection terminals N$^{th}$ connection terminals 130. At this time, N is an integer, the same or greater than 2. As shown in FIG. 2, each of the terminals 110, 120, 130 includes: a broadcasting receiving unit 113 for receiving data transmitted from terminals that relay an internet broadcasting server 100 or broadcasting data; a data processing/displaying unit 114 for processing and outputting data received by the broadcasting receiving unit 113; and a broadcasting relaying unit 112 for getting connected with the internet broadcasting server 100 through TCP/IP or UDP protocol to relay broadcasting data by receiving broadcasting data and transmitting the received data to other neighboring terminals.

In order to carry out an internet broadcasting at the network thus constructed, above all, it is necessary to install a software program adequate for the broadcasting relaying unit 112, broadcasting receiving unit 113 and broadcasting data processing and displaying unit 114 of the terminal 110.

Specifically, the broadcasting relaying unit 112 performs a broadcasting and relaying function of getting an access to the internet broadcasting server 100 through TCP/IP or UDP to receive broadcasting data transmitted from the internet broadcasting server 100 and transmit the data to other terminals 120 that request an access.

The broadcasting receiving unit 113 receives the broadcasting data transmitted by the internet broadcasting server or the broadcasting data relaying terminals and transmits the data to the data processing and displaying unit 114.

The data processing and displaying unit 114 performs a function of displaying moving pictures on the screen of a terminal or processing audio data by receiving broadcasting data from the broadcasting receiving unit 113, so as to process and display the data on the screen or other instruments.

When the procedure of receiving or relaying the internet broadcasting data with the secondary connection terminal 120 is considered, the broadcasting receiving unit 113 receives and transmits broadcasting data to the data processing and displaying unit 114 when the broadcasting data start to be received.

With reference to FIG. 3, description will be made on an internet broadcasting method using a hierarchical data transmission in accordance with the present invention.

First of all, there are some limitations in that an internet broadcasting server provides multimedia data and that the integer of the primary connection terminals is predetermined to be the best condition of providing data. In other words, a critical value should be preset for the maximum number of users who can get an access while the quality of broadcasting data is maintained in consideration of system functions, data capacity and the like.

When a connection request signal is received from a terminal, it is discriminated whether the number of previously connected terminals is smaller than a critical value (S305). If it is determined to be smaller than the critical value, a connection is approved to transmit broadcasting data (S311). It is discriminated whether the data transmission is completed (S319). If the data transmission is completed, a connection is finalized. If not, the flow returns to step (S311) for transmission of broadcasting data.

If the number of previously connected terminals is greater than a critical value at step S305, a direct data transmission with the internet broadcasting server is shut and a connection is induced to one of the terminals 110. In other words, one of the previously connected primary connection terminals is selected as a sub-server and recorded at a database (S305). The internet broadcasting server is to store the related information on the previously connected terminals such as an address of the primary connection terminal, the number and addresses of secondary terminals connected to the primary terminal and the like.

A re-connection inducing signal including the address of the sub-server is transmitted to a connection requested terminal (S309) to induce re-connection with the sub-server.

When a connection attempting terminal receives a signal from a server, it is discriminated whether the received signal is broadcasting data or a re-connection inducing signal (S305). If the received signal is broadcasting data, it is displayed for users to view (S317). If the received signal is a re-connection inducing signal, the received address is used to transmit a connection requesting signal to the primary connection terminal selected as a sub-server (S315).

At this time, all the terminals attempting for a connection from the time that the number of terminals exceeds a critical value are equally distributed to the primary connection terminals to induce connection. The primary connection terminal connected with a server receives broadcasting data from the server and displays the data for users to view. If the connection of a connection requesting terminals induced by the server is approved or if the connection becomes impossible, the connection is induced to any one of the secondary connection terminals that have been previously connected. At this time, the primary and secondary terminals and all the terminals to be described later have a relaying function of getting connected with the server or high level terminals to receive, relay and transmit data to low level terminals. The number of terminals to be connected is restricted to a range within which the function of terminals will not be deteriorated by reception, relay and transmission of data.

The secondary terminals connected with the primary connection terminals, the connection of which is induced by the server, receive broadcasting data from the server, display it for users to view and induce the connection of the connection requesting terminals induced by the primary connection terminals.

The aforementioned procedure is repeated, so that a connection is induced by the N-2th connection terminals Then, the Nth connection terminals connected with the N-1th connection terminal receive broadcasting data from the server and display it for users to view. If the connection of a connection requesting terminals induced by the N-1th connection terminal server is approved or if the connection becomes impossible, the connection is induced to any one of the N-2th connection terminals that have been previously connected.

If broadcasting data cannot be received for a predetermined period of time just after the start of data reception or in the middle of data reception, a relaying request is made to the broadcasting relay unit 112 of the terminal. If the broadcasting relaying unit 112 receives a relay requesting signal, it gets directly connected with the internet broadcasting server 100 instead of the primary connection terminal 110 to receive data through TCP/IP or UDP and transmit data to other terminals, thereby relaying broadcasting data.

The data transmitted from the broadcasting relaying unit 112 is further transmitted to the broadcasting receiving unit of other terminals connected with an identical LAN as well as the broadcasting receiving unit 113 installed in the terminal. Also, it can be transmitted to terminals of other regions connected via a router (router m).

As described above, according to an internet broadcasting of the present invention, a predetermined number of terminals can be connected, and the connection attempting terminals, other than the number of the predetermined terminals, are induced to get connected with low level terminals, instead of the server or high level terminals, for reception of data at an identical speed, making it possible to provide a large capacity of broadcasting service without an increase in the capacity of the server or communication load.

In the present invention, the server is at the highest level and the number of terminals to be connected with the server is restricted. If a connection request is made by terminals over the predetermined number thereof, the terminals are induced to any one of low-level terminals which have been already connected. Then, the previously connected terminal is made to play a role as a relaying unit for data transmission, so as to make it possible to provide quality broadcasting to all internet broadcasting users without an increase in the capacity of a server. Besides, the number of low level terminals to be connected with a server or terminals is restricted, so that a great number of terminals are connected with a server or a terminal to prevent a bottleneck problem or breakdown of the server that may be caused by overload of communication.

Now, an internet broadcasting system and an internet broadcasting method using dispersion IP multicasting will be described in detail with a preferred embodiment of the present invention.

FIG. 4 illustrates a network structure of an internet broadcasting system using a dispersion IP multicasting method in accordance with an embodiment of the present invention.

First of all, an internet broadcasting system using dispersion IP multicasting of the present invention, as shown in FIG. 4, includes: an internet broadcasting server 10 for broadcasting multimedia data like moving pictures and audio data; terminals 47 connected with the internet broadcasting server 10 through TCP/IP or UDP protocol to receive broadcasting data, display it for users to view and relay it to other adjacent terminals; and a plurality of IP multicasting routers (router m, 20~30) having an IP multicasting function of connecting the server and the plurality of terminals on the internet.

At this time, general routers (router n, 34, 36) have no IP multicasting function, differently from IP multicasting routers (routers m), so that IP multicasting data cannot be transmitted between two networks connected through the general routers.

Operations of an internet broadcasting system using a dispersion IP multicasting in accordance with an aspect of the present invention thus constructed will be described with reference to an internet broadcasting method using a dispersion IP multicasting in accordance with another aspect of the present invention.

As shown in FIG. 4, there are divided three internet communication regions A, B, C that can be connected with only IP multicasting routers (20~30).

Differently from terminals (40, 41) belonging to region A, terminals belonging to regions B and C cannot directly receive IP multicasting data to be broadcasted to the internet broadcasting server (10). Therefore, terminals belonging to regions B and C should be directly connected with a broadcasting server through TCP/IP or UDP protocol to thereby receive broadcasting data. Accordingly, terminals (43, 47) of regions B and C respectively get connected with the server to receive data. The received data is converted into IP multicasting data to transmit to other terminals of the same region. The other terminals of regions B and C receive the IP multicasting data, which the terminals (43, 47) are relaying, to thereby transmit broadcasting data to all terminals.

In the network thus constructed, a terminal to carry out an internet broadcasting operation using the present invention is similar to the terminal 110 described above with reference to FIG. 2. The terminal includes a broadcasting unit 112, a broadcasting receiving unit 113 and a broadcasting data processing and displaying unit 114. Functions of respective units are also similar except one fact that IP multicasting protocol is used in the aforementioned network. Such functional units can be accomplished by software that should be received from an Internet broadcasting server for installation before or at the same time as reception of broadcasting data.

The broadcasting relaying unit 112 is programmed for a broadcasting relaying function of receiving broadcasting data transmitted from the internet broadcasting server 10, converting into IP multicasting data and transmitting the IP multicasting data to other neighboring terminals after getting connected with the internet broadcasting server 10 through TCP/IP or UDP. The broadcasting and receiving unit 113 should be programmed for a function of receiving IP multicasting data transmitted by an adjacent broadcasting and relaying terminal and transmitting it to the data processing and displaying unit 114.

Furthermore, the data processing and displaying unit 114 is part of displaying moving pictures and processing audio data on the monitor of a terminal, to receive broadcasting data from the broadcasting receiving unit 113, process and display the data on the monitor or other devices.

The procedure of receiving or relaying the internet broadcasting with a terminal will be as follows.

If IP multicasting data cannot be received for a predetermined period of time just after the start of receiving broadcasting data or during reception of broadcasting data, a request is made to relay broadcasting data to the broadcasting relaying unit 112. Then, the broadcasting relaying unit 112 gets directly connected with an internet broadcasting server 10 to receive data through TCP/IP or UDP, convert received data into IP multicasting data and transmit the IP multicasting data to adjacent terminals.

The data transmitted from the broadcasting relaying unit 112 is further transmitted to the broadcasting receiving unit 113 installed in the terminal and he broadcasting receiving units of other terminals connected to at least an identical LAN and to the terminals of other regions connected through routers router m) supporting IP multicasting data.

Description will be made on the aforementioned procedure with reference to FIG. 4. Region A does not require any other relaying function as it can directly receive IP multicasting data from the internet broadcasting server 10. On the contrary, region B or C needs an additional relaying function.

The terminals (43, 47) of respective regions B and C are predetermined terminals out of the terminals (40~47) to carry out the relaying function. The terminals (43, 47) receive data directly from the internet broadcasting server 10 and transmit the data using IP multicasting to adjacent terminals.

As a result, even if only two terminals 43, 47 out of the 8 terminals illustrated in FIG. 1 is connected with the internet broadcasting server (10), all the terminals (40~47) can receive identical broadcasting data at the same time.

By way of the aforementioned method, broadcasting data can be directly received by getting connected with the server through TCP/IP or UDP at regions where IP multicasting is impossible (that is, regions that cannot be connected through IP multicasting routers). The terminals (43, 47) receiving data directly from the internet broadcasting server (10) have a relaying functions of converting the broadcasting data into IP multicasting data immediately and retransmitting the IP multicasting data to adjacent terminals, thereby making it possible to construct a relaying network dispersed into regions that can support IP multicasting.

In the internet broadcasting system and internet broadcasting method using dispersion IP multicasting of the present invention thus constructed, data is transmitted to only a very small number of terminals connected with an internet broadcasting server, so as to decrease communication load of the server and significantly increase the number of terminals that can receive broadcasting using IP multicasting. Particularly, network users' terminals of a large enterprise that uses an identical intranet are advantageous in significantly reduce load on the network of the enterprise as well as the internet broadcasting server because broadcasting data can be received even when only one terminal gets connected with the internet broadcasting server regardless of the total number of terminals in the enterprises.

Now, a detailed description will be made on a method of achieving multicasting under a modem environment using xDSL and PSTN.

Figure 5:
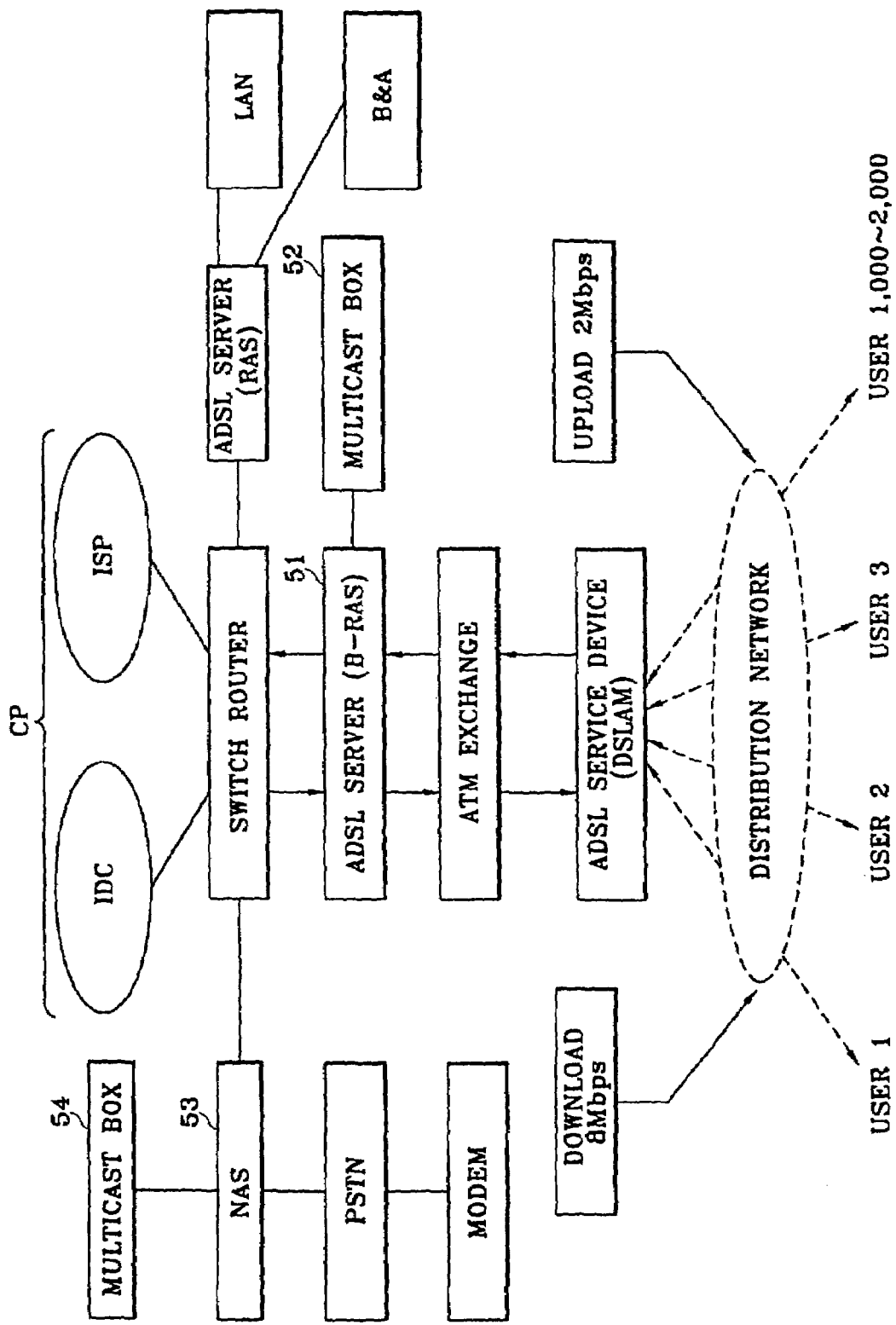
FIG. 5 illustrates a structure of a multicasting relay system to which the present invention is applied.

FIG. 5 illustrates the structure of a multicasting relaying system applied to the present invention, a multicasting relaying system to achieve multicasting under a modem environment using xDSL (particularly, ADSL) and PSTN.

As shown in FIG. 5, the multicasting relaying system is constructed with an internet data center (IDC) for providing multimedia data like moving pictures and audio data, a contents provider (CP) like an internet service provider (ISP), a switch router for distributing multimedia data to a remote access server (RAS) terminal, a base band-RAS (B-RAS) terminal and a network attached storage (NAS) terminal, a RAS for providing multimedia data distributed through the switch router to LAN users through LAN, and building and apartment (B&A), a B-RAS (51) for providing multimedia data distributed through the switch router for ADSL users through ADSL service device (DSLAM) and a NAS (53) for providing multimedia data distributed through the switch router for modem users through modems.

As described above, a route to transmit data by ADSL to final network connectors is as follows: a contents provider (CP) (internet data center (IDC), an internet service provider (ISP) and the like→ADSL server (B-RAS)→asynchronous transfer mode ATM switching system→ADSL service device (DSLAM)→a plurality of users. Also, a route to transmit data by PSTN to final network connectors is as follows: contents provider (CP)→network attached storage (NAS)→public switch telephone network (PSTN)→modem→users.

In order to achieve a multicasting data dispersing and processing environment, a CAST 365 server is moved along with a media server of a CP to install an internet broadcasting program (CAST 365 program) of an internet broadcasting server shown in FIG. 3 and a multicast box servers (52, 54) in FIG. 5, in which a multicasting signal relaying program is mounted in the NAS (53). Furthermore, a relaying function performing program is installed at the terminal of a connector (xDSL connector or modem connector) who gets connected with the CP for communication with the CAST 365 program. Therefore, it becomes possible to secure an increase in the number of simultaneous multicasting connectors.

Figure 6:
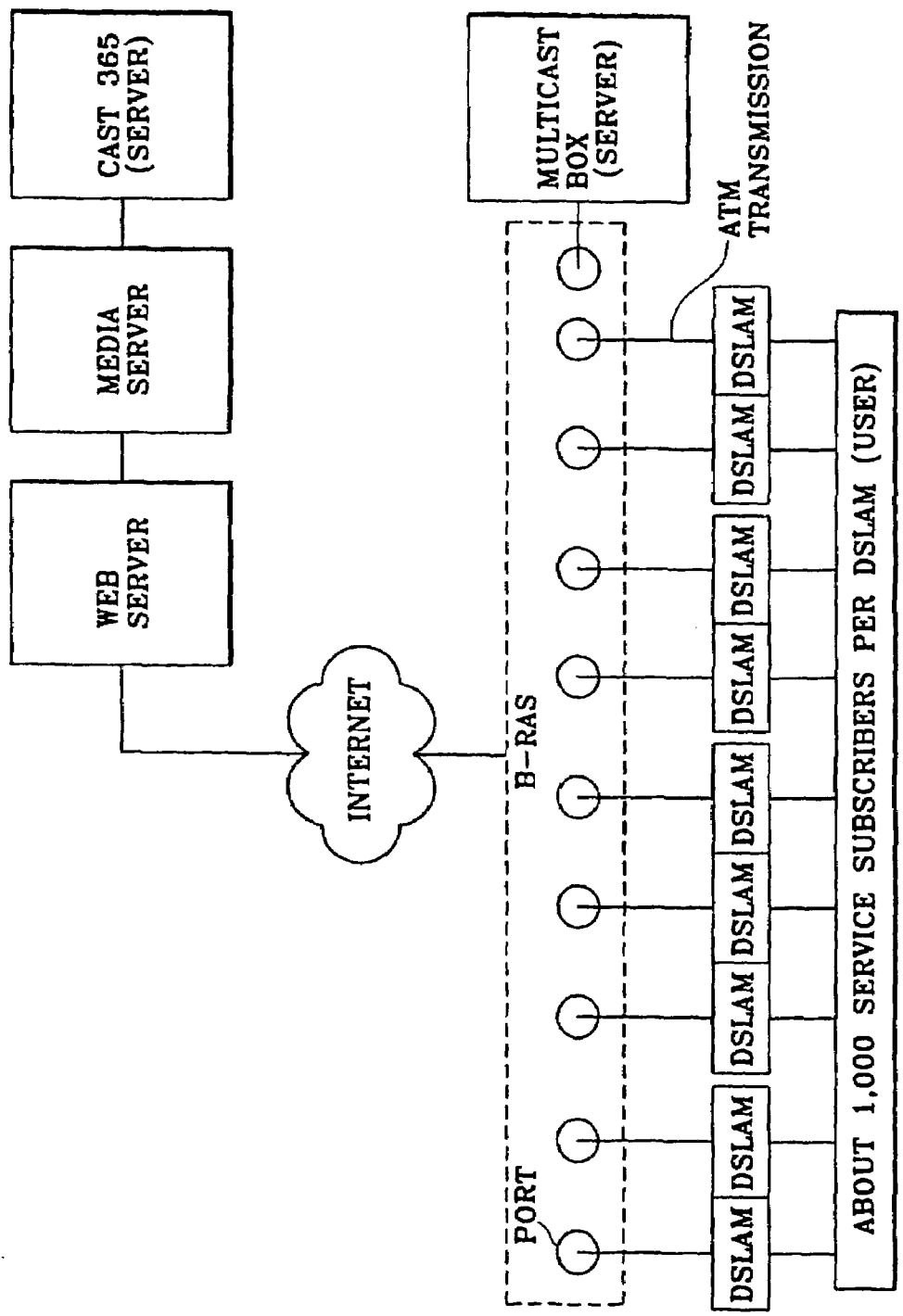
FIG. 6 illustrates a detailed structure of a multicasting relay system to which the present invention is applied.

Hereinafter, a detailed description will be made with reference to FIG. 6 on functions of a CAST 365 program of a CAST 365 server and a multicasting signal relaying program of a multicast box (server) and a method for achieving multicasting at the related xDSL.

The CAST 365 server and multicast box (server) is always connected with a transmission control protocol and the multicast box (server) is maintained as a data reception stand-by state with its socket open. A multicasting signal-relaying program moving along with the CAST 365 program of a CAST 365 server installed at the CP server is mounted in the multicast box (server).

Basically, the CAST 365 server secures IP addresses of respective multicast boxes (servers) and those of all connectors (clients) below a B-RAS, where the multicast boxes (servers) are installed, as DB.

The multicast boxes (servers) occupy one port, being at a stand-by state for receiving data from the CAST 365 with socket open. The multicast boxes (servers) are in connection with TCP at all times, and UDP/TCP is used for data transmission. Moreover, the multicast boxes (servers) secure IP addresses of CAST 365 servers and those of all connectors (clients) below a corresponding B-RAS as DB.

At last, DSLAM is installed at a telephone office, to which hundreds of or thousands of modems are plugged according to the number of service users. One DSLAM is usually positioned apart as an independent device.

When a request is made on a specific broadcasting reception, each subscriber terminal receives an IP address of a multicast box (server) and a port number. At this time, the data transmission and reception is carried out by using UDP/TCP.

Now, a procedure of data transmission will be briefly described below.

First of all, xDSL initial client #1 is connected with a web server (for instance, an internet broadcasting organization and the like) of a CP to select desired contents (preferably, an internet broadcasting), the CAST 365 server (program) of the media server moving along with the web server tracks an IP address of client #1 and check a multicast box (server) to which client #1 belongs to thereby transmit data to a relevant multicast box (server) through UDP/TCCP.

Then, data is accumulated (for about one second) at the relevant multicast box (server).

Later, the relevant multicast box (server) transmits data (including IP data of its belonging (higher) multicast box) through UDP/TCP. This data is a TTL1 (Time To Live) command.

TTL1 is a command to transmit multicasting data to region D-Class (imaginary IP) to enable clients of one router region to receive multicasting broadcasting data. In other words, when DSLAM is considered as one router region and a signal received initial connector (client #1) transmits broadcasting data (frequency signal) to region D-Class to make the relevant DSLAM support multicasting, not only client #1 but also clients #2, . . . , #n also receive broadcasting data from the relevant DSLAM by using the TTL1 command.

When the relevant DSLAM works (the relevant DSLAM supports multicasting) according to the TTL1 command, client #1 receives (views broadcasting data) multicasting data of the relevant DSLAM. However, when TTL1 command fails to be carried out two or three times, a relevant multicast box (server) transmits a TTL0 command, so that it becomes to receive multicasting data (view broadcasting data) by one-on-one connection with the relevant multicast box (server).

Now, detailed description will be made about multicasting signal relaying algorithm (a load dispersing program for xDSL users) programmed at the multicast box (server) of the B-RAS (51) and that (a load dispersing program for modem users under a PSTN environment) programmed at the multicast box (server) (54) of the NAS (30).

Figure 7A:
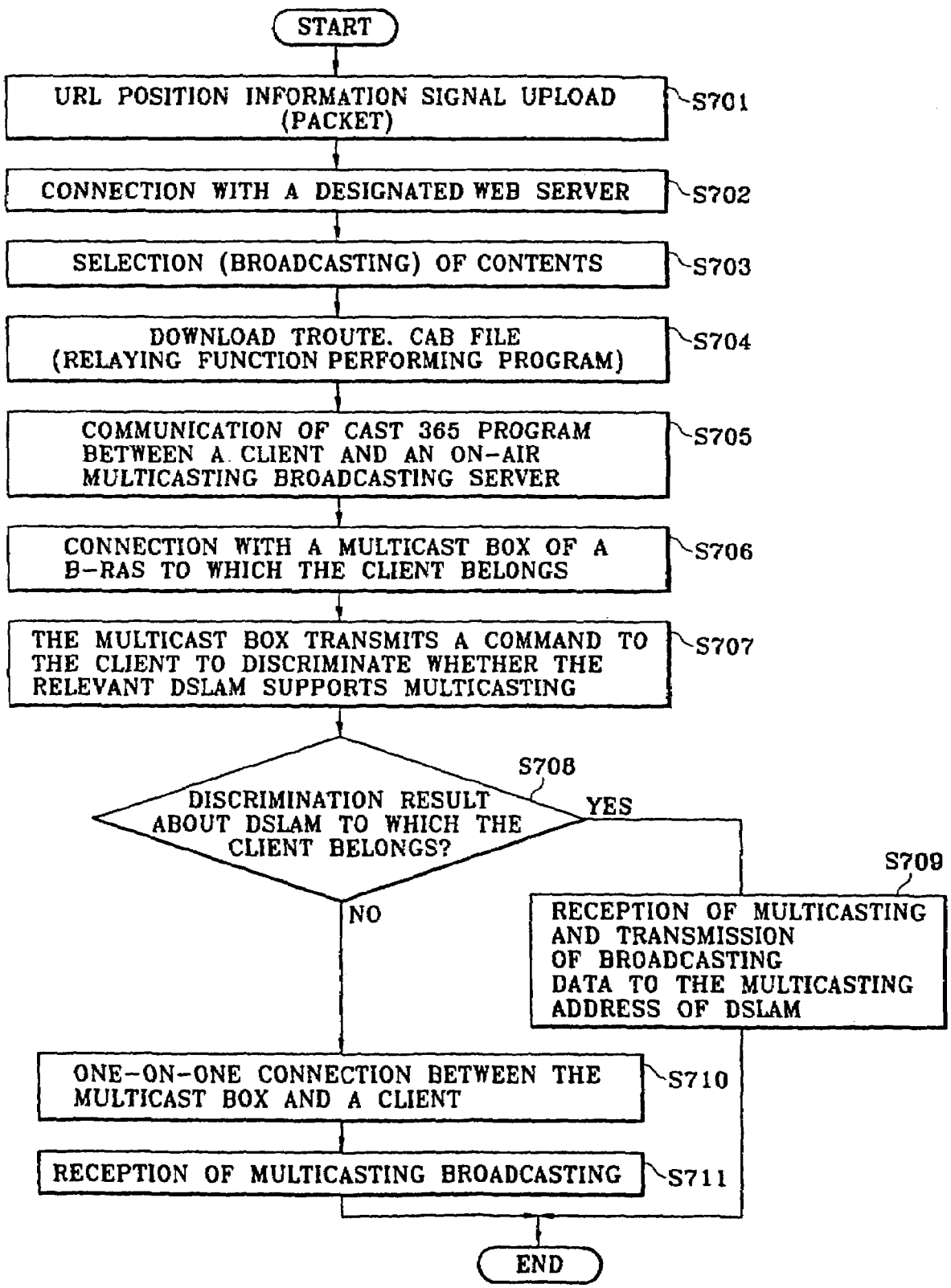
FIGS. 7a and 7b are flowcharts for illustrating a multicasting relay method in accordance with an embodiment of the present invention.
Figure 7B:
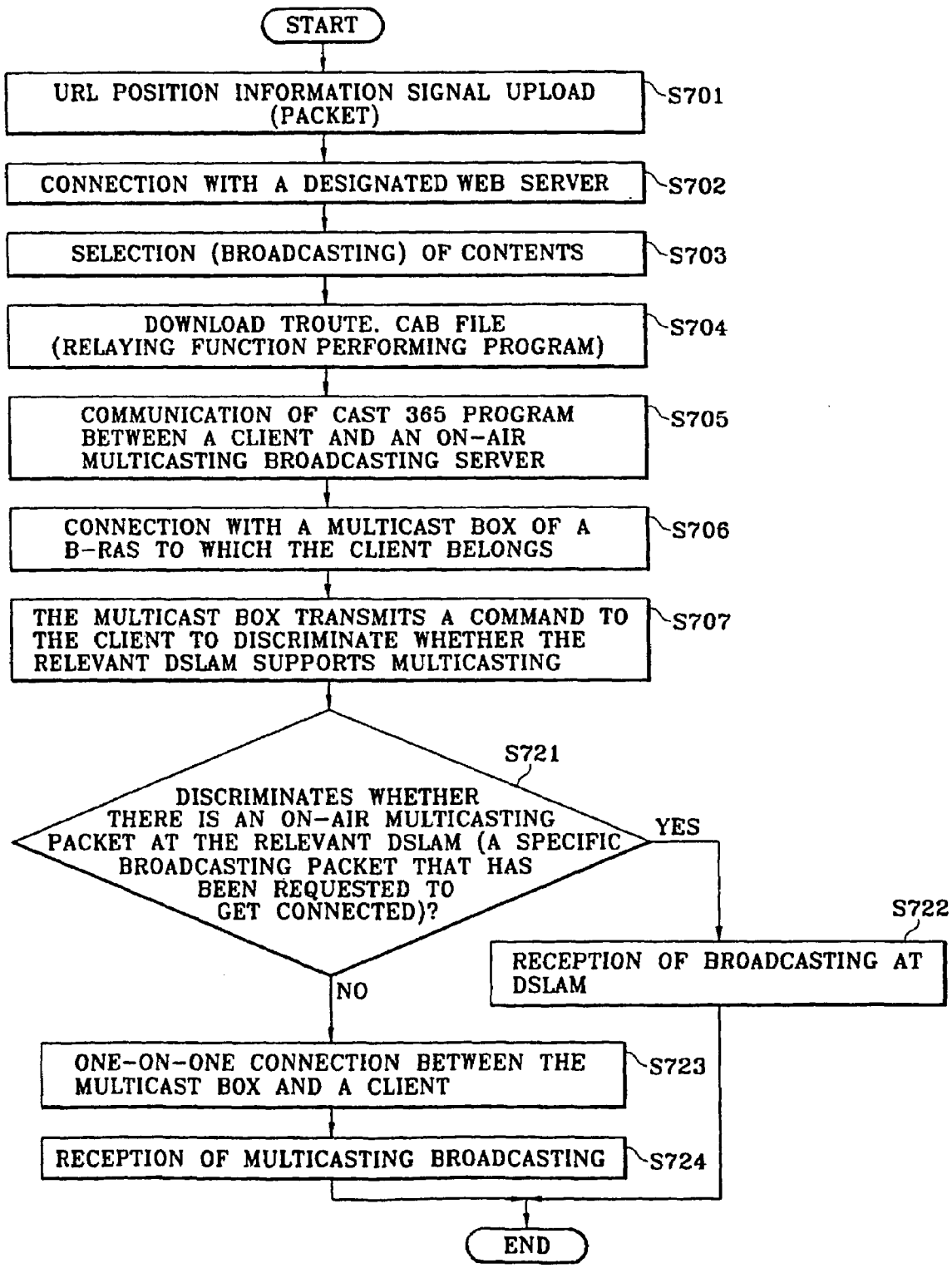

FIGS. 7*a* and 7*b* are flowcharts for illustrating a multicasting relaying method of the present invention, a procedure for accommodating much more simultaneous multicasting ADSL connectors under the conventional identical network environment (under the B-RAS).

Above all, a process of dealing with a first ADSL connector (ADSL client #1) will be described with reference to FIG. 7*a*.

At first, when the first ADSL connector (ADSL client #1) designates (uploads) an internet address (URL) (S701) and gets connected with a web server (for instance, an internet broadcasting office or the like) (S702) to select desired contents (preferably, internet broadcasting) of the related web server (S703), a relaying function performing program (for instance, Troute.cab file) downloads at the terminal of the ADSL client #1 (S704). The relaying function performing program communicates with the CAST 365 program of the CAST 365 server moving along with a multicasting broadcasting transmitting media server (S705), and further gets in connection with the multicasting signal relaying program mounted in the multicast box (server) (52) of the B-RAS (51) to which the first ADSL client #1 belongs (S706).

The CAST 365 program induces the first ADSL client #1 to the multicast box (server) (52) of the B-RAS (51). In other words, the CAST 365 program transmits multicasting broadcasting data of CP to the multicast box (server) (52) installed the relevant B-RAS (51) to which the first ADSL client #1, who requests data reception first, belong, and, then, gets in connection with relevant multicast box (server) (52) when other clients (#1, . . . , #n) request.

Later, the multicast box (server) (52) transmits to the relaying function performing program a TTL1 command to discriminate whether the relevant DSLAM supports multicasting (S707). The relaying function performing program discriminates whether the relevant DSLAM of a client can support multicasting (S708).

As a result of discrimination, if the DSLAM of ADSL client #1 terminal can support the multicasting, the relaying function performing program receives multicasting broadcasting data from the B-RAS (51) and transmits the broadcasting data to the multicasting address (D-Class) of the DSLAM (S709). At this time, the broadcasting data is transmitted to the multicasting address so as to make other following ADSL connectors (ADSL client#2, . . . , client#n) receive multicasting broadcasting data at not the B-RAS (51) but the DSLAM.

As a result of discrimination, if the DSLAM of ADSL client #1 terminal cannot support multicasting, the relaying function performing program receives gets in one-on-one connection with the multicast box (server) (52) according to the TTL0 command (S710) to thereby receive multicasting broadcasting data from the B-RAS (51) (S711).

On the other hand, with reference to FIG. 7b, a procedure of dealing with a second or other ADSL connectors (ADSL client#2, . . . , client#n) will be described below.

The flow is the same up to step S707, the relaying function performing program discriminates whether an on-air multicasting packet (a specific broadcasting packet requesting connection) exists at the DSLAM to which its terminal belongs (S721). If the on-air multicasting exists, the DSLAM receives the broadcasting data (S722). If not, the relaying function performing program gets in one-on-one connection with the multicast box (server) (52) (S723) and receives multicasting broadcasting data from the B-RAS (51) (S724).

Figure 8:
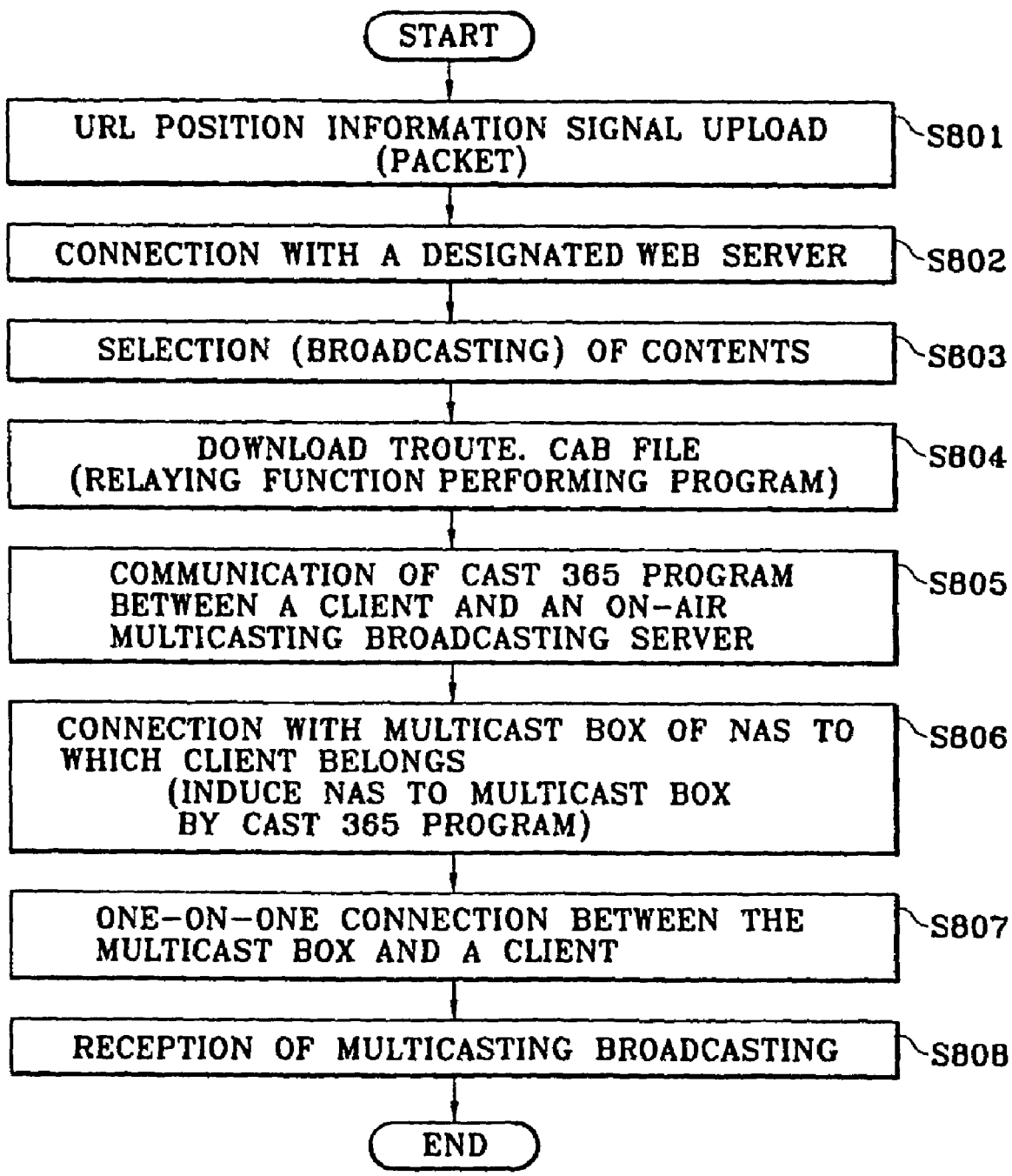
FIG. 8 is a flowchart for illustrating a multicasting relay method in accordance with another embodiment of the present invention.

On the other hand, with reference to FIG. 8, a procedure of accommodating much more simultaneous multicasting modem connectors under the conventional identical network environment (under a NAS) will be described below.

At first, when a modem client designates (uploads) an internet address (URL) (S801) and gets connected with a web server having the relevant URL (for instance, an internet broadcasting office or the like) (S802) to select desired contents (multimedia data like audio or visual data) of the related web server (S803), a relaying function performing program (for instance, Troute.cab file) downloads at the terminal of the modem client (S804). The relaying function performing program communicates with the CAST 365 program of the CAST 365 server moving along with a multicasting broadcasting transmitting media server (S805), and further gets in connection with the multicasting signal relaying program installed in the multicast box (server) (54) of the NAS (53) to which the modem client belongs (S806).

The CAST 365 program induces the modem client to the multicast box (server) (54) of the B-RAS (53). In other words, the CAST 365 program transmits multicasting broadcasting data of CP to the multicast box (server) (54) installed the relevant NAS (53) to which the modem client, who requests data reception first, belong, and, then, gets in connection with relevant multicast box (server) (54) when other clients (#1, . . . , #n) request.

Later, the relaying function performing program of the terminal gets in one-on-one connection with the multicasting signal relaying program installed in the multicast box (server) (54) (S807), and receives multicasting broadcasting data from the NAS (53).

Herein, the procedure of dealing with a second or other modem clients is the same as that of the first modem client. Therefore, there is no distinction therebetween in describing the procedure of dealing with all modem connectors (modem client#n).

Figure 9A:
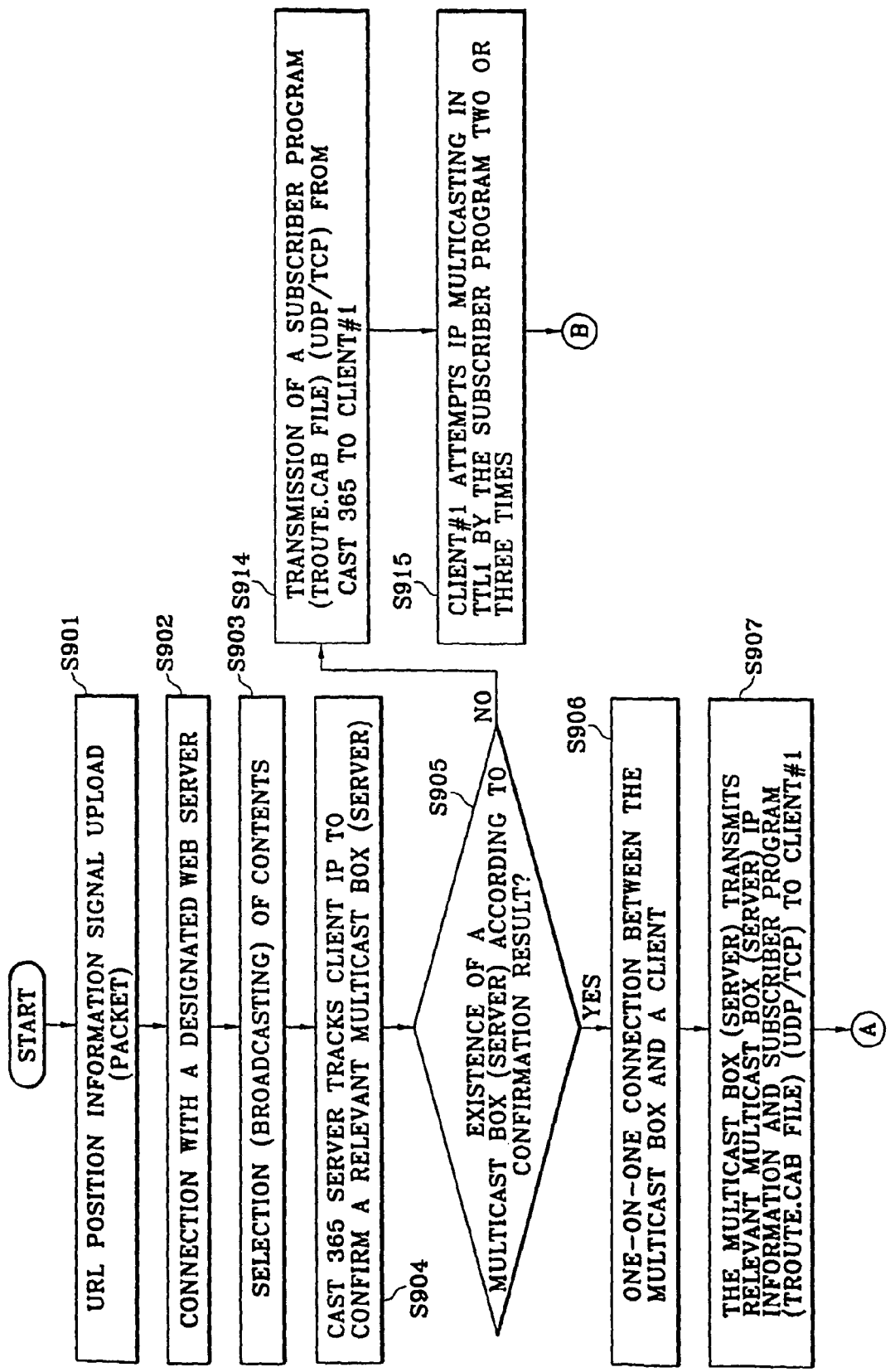
Figure 9B:
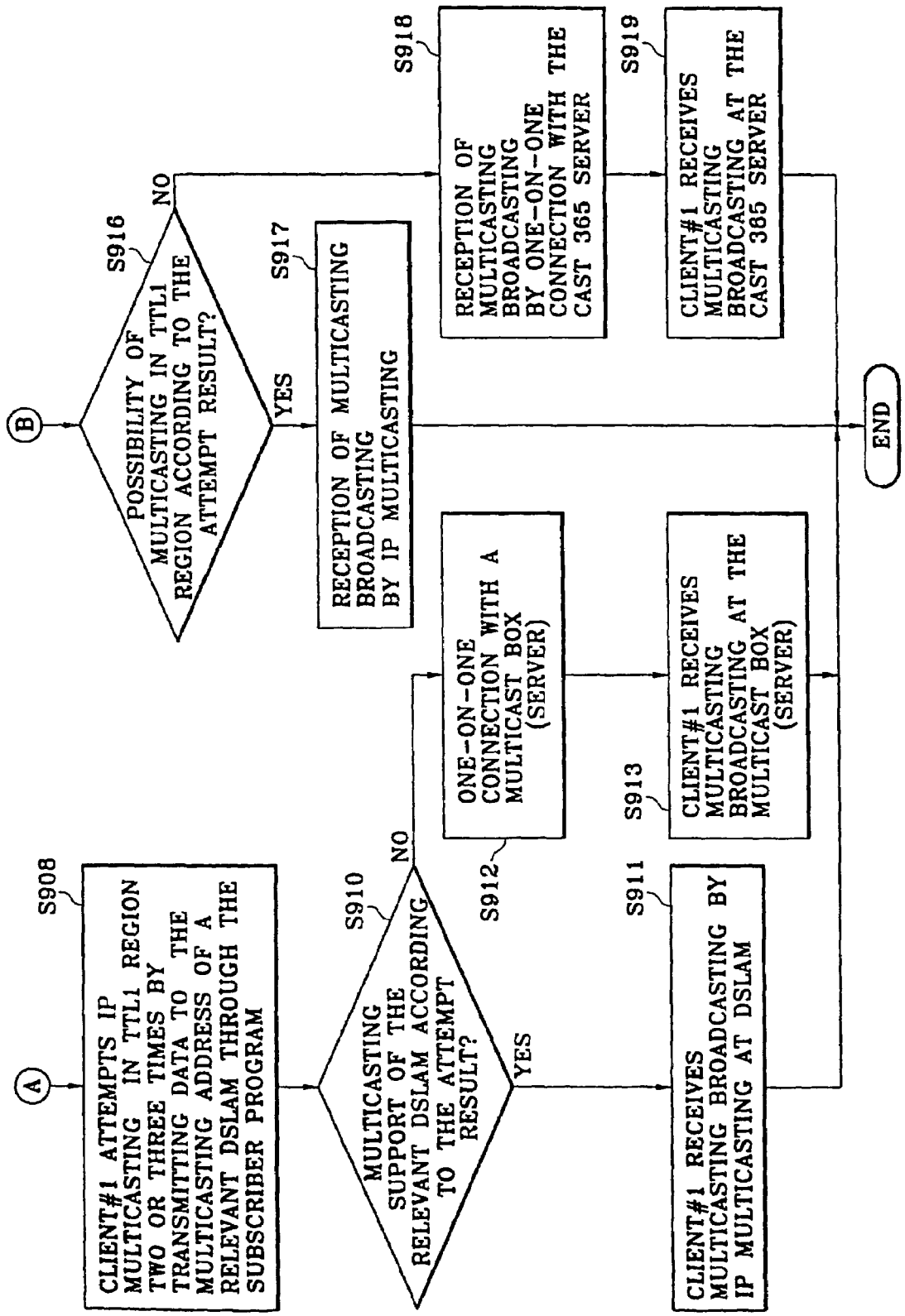

Now, as described above with reference to FIGS. 7a and 7b, a method for achieving multicasting for ADSL subscribers will be described in detail with reference to FIGS. 9a, 9b and 9c.

Above all, with reference to FIGS. 9a and 9b, a procedure of dealing with a first ADSL connector (ADSL client#1) will be described below.

At first, when the first ADSL connector (ADSL client #1) designates (uploads) an internet address (URL) (S901) and gets connected with a web server (for instance, an internet broadcasting office or the like) (S902) to select desired contents (preferably, internet broadcasting) of the related web server (S903), a CAST 365 server (program) of a media server moving along with a the web server tracks the IP of the first client #1, confirms a multicast box (server) to which the first ADSL subscriber belongs (S904) and discriminates whether the relevant multicast box (server) exists (S905).

As a result of the discrimination, if the relevant multicast box (server) exists, broadcasting data is transmitted to the multicast box (server) through UDP/TCP (S906).

Then, the multicast box (server) of the first ADSL subscriber transmits the IP information and subscriber program (a relaying function performing program of a terminal) of the relevant multicast box (server) to the terminal of ADSL client#1 (S907). Later, the relaying function performing program (for instance, Troute.cab file) downloads at the terminal of the first ADSL client#1. The relaying function performing program transmits data to the multicasting address of the DSLAM to which the first ADSL client#1 belongs to make two or three attempts of the IP multicasting within TTL1 region (S908).

As a result of the attempts, if the DSLAM of ADSL client #1 terminal can support multicasting (S910), the ADSL client #1 receives multicasting broadcasting data by IP multicasting at the DSLAM to which ADSL client #1 belongs (S911).

As a result of the attempts, if the DSLAM of ADSL client #1 terminal can not support multicasting (S910), the DSLAM gets in one-on-one connection with the multicast box (server) of the B-RAS to which ADSL client #1 belongs (S912). Then, the ADSL client#1 receives multicasting broadcasting data from the relevant multicast box (server) which ADSL client #1 belongs (S913).

As a result of the discrimination, if the relevant multicast box (server) does not exist, a relaying function performing program (for instance, Troute.cab file) is transmitted from the CAST 365 to the terminal of the ADSL client#1 through UDP/TCP (S914). Later, the relaying function performing program (for instance, Troute.cab file) downloads at the terminal of the ADSL client #1. The relaying function performing program of the terminal makes two or three attempts of the IP multicasting within TTL1 region (S915).

As a result of the attempts, if the multicasting is possible within the TTL1 region (S916), the ADSL client #1 receives multicasting broadcasting data by IP multicasting within the TTL1 region (S917).

As a result of the attempts, if the multicasting is not possible within the TTL1 region (S916), the ADSL client #1 gets in one-on-one connection with a CAST 365 server (S918) and receives multicasting broadcasting data from the CAST 365 server (S919).

On the other hand, with reference to FIG. 9c, description will be made on a procedure of dealing with a second or other ADSL clients (#2, . . . , #n) below.

At first, when ADSL clients #2, . . . , #n designate (upload) an internet address (URL) (S921) and gets connected with a web server (for instance, an internet broadcasting office or the like) having the relevant URL (S922) to select desired contents (preferably, internet broadcasting) of the related web server (S923), the CAST 365 program of the media server moving along with the web server tracks an IP of the clients and confirms the multicast box (server) to which the clients belong (S924) to thereby discriminates whether the relevant multicast box (server) exists (S925).

As a result of the discrimination, if the relevant multicast box (server) does not exist, the procedure of dealing with ADSL clients will be the same (S914~S919) as that for the ADSL client #1 described above with reference to FIGS. 9a and 9b.

If the multicast box (server) exists as a result of the discrimination, it is further discriminated whether transmission of broadcasting data is possible because there is a prior connector at the relevant multicast box.

As a result of the discrimination, if there is a prior connector at the relevant multicast box (server) to allow for transmission of broadcasting data, the multicast box (server), to which the clients belong, transmits the IP information and subscriber program (a relaying function performing program of a terminal, Troute.cab file) to the terminal of ADSL clients (S927). Later, the relaying function performing program (for instance, Troute.cab file) downloads at the terminals of ADSL clients (#2, . . . , #n). The relaying function performing program discriminates whether the relevant DSLAM can receive multicasting packet data by IP multicasting (S928).

As a result of the discrimination, if the relevant DSLAM can transmit multicasting packet data by IP multicasting, the ADSL clients (#2, . . . , #n) receive multicasting broadcasting data by IP multicasting with the relevant DSLAM (S929).

As a result of the discrimination, if the relevant DSLAM can not transmit multicasting packet data by IP multicasting, the ADSL clients (#2, . . . , #n) get in one-on-one connection with the relevant multicast box (server) of B-RAS to which ADSL clients belong (S930) and receive multicasting broadcasting data by IP multicasting with the relevant multicast box (server) (S931).

As a result of the discrimination (S926), if there is no prior connector at the relevant multicast box (server) to make transmission of broadcasting data impossible, the procedure of dealing with the ADSL clients (#2, . . . , #n) is the same as that for the ADSL client #1 (S906~S913).

At the time of the multicasting broadcasting, the relaying function of the multicast box (server) allows for an increase in the number of simultaneous connectors in one DSLAM under the same network environment but no restriction on the number of simultaneous connectors in terms of technical principles.

Realistically, in considering such an importance of ADSL that the number of super speed telecommunication users reaches 4 millions, a smooth simultaneous multicasting connection under the xDSL environment is a required technology for improving the super speed telecommunication network industry. Also, it becomes possible that multimedia data like audio data can be transmitted to many people at the same time under a low speed PSTN modem, so that the network telecommunication like an internet will provide a basis for a swift progress centering the multimedia data communication.

The aforementioned method of the present invention can be stored at a recording medium (CD-ROM, RAM, floppy disc, hard disc, magnetic optical disc or the like) that can be programmed and read with a computer.

Moreover, having described about the preferred embodiment and operational effects of the present invention, it is to be understood that the invention is not limited to those precise embodiments, and that various changes and modifications may be effected therein by one skilled in the art without departing from the scope or spirit of the invention as defined in the appended claims.

As described above, there are advantages in the present invention in that the multicasting broadcasting programs can be viewed or listened without any restriction on simultaneous connection under the conventional network environment (identical B-RAS, NAS or the like), thereby making internet contents providers significantly increase the profit in case of paid services by securing the greater number of simultaneous connectors with the same cost for network use, and that it will be an opportunity to put a corner stone for introduction and expansion of multicasting of national or international broadcasting organizations.

What is claimed is:

1. A method of receiving a desired content by a user terminal, the method comprising:
   connecting, by a user terminal, to a content providing server via a DSL network connected to the Internet, wherein the DSL network comprises a local DSL device, which links between the Internet and the user terminal;
   requesting, by the user terminal, a desired content from the content providing server;
   in reply to requesting, receiving, by the user terminal, a command from the content providing server for directing the user terminal to a multicast box that is configured to relay data for the desired content from the content providing server to the user terminal, wherein the multicast box is not for providing the user terminal with an Internet connection;
   subsequent to receiving the command, communicating, by the user terminal, with the multicast box according to the command from the content providing server;
   receiving, by the user terminal, a command from the multicast box to communicate with the local DSL device to obtain information for use in determining whether the local DSL device supports multicasting;
   in reply to the command from the multicast box, communicating with the local DSL device, by the user terminal, to receive a response from the local DSL device for use in determining whether the local DSL device supports multicasting; and
   receiving, by the user terminal, the data from the multicast box;
   if the local DSL device supports multicasting, transmitting the data received from the multicast box to a multicasting address of the local DSL device to enable the local DSL device to multicast the data to other user terminals connected to the local DSL device.

2. The method of claim 1, wherein the user terminal downloads a computer program configured to enable the user terminal to communicate with the content providing server and the multicast box so as to receive the data from the multicast box.

3. The method of claim 2, wherein downloading occurs when the user terminal requests the desired content.

4. The method of claim 1, wherein upon requesting the content providing server determines whether there is a multicast box available to service the user terminal and transmit data for the desired content if determined that the multicast box is available to service the user terminal.

5. A method of receiving a desired content by a user terminal, the method comprising:
   connecting. by a user terminal, to a content providing server via a DSL network connected to the Internet, wherein the DSL network comprises a local DSL device, which links between the Internet and the user terminal;
   requesting, by the user terminal, a desired content from the content providing server;
   in reply to requesting, receiving, by the user terminal, a command from the content providing server for directing the user terminal to a multicast box that is configured to relay data for the desired content from the content providing server to the user terminal, wherein the multicast box is not for providing the user terminal with an Internet connection; and
   subsequent to receiving the command, communicating, by the user terminal, with the multicast box to determine whether the local DSL device supports multicasting,
   wherein if the local DSL device supports multicasting, the user terminal receives the data from the local DSL device, wherein if the local DSL device does not support multicasting, the user terminal receives the data from the multicast box via one-on-one connection.

6. A method of receiving a desired content by a user terminal, the method comprising:
   connecting, by a user terminal, to a content providing server via a DSL network connected to the Internet, wherein the DSL network comprises a local DSL device, which links between the Internet and the user terminal;
   requesting, by the user terminal, a desired content to the content providing server;
   in reply to requesting, receiving, by the user terminal, a command from the content providing server for directing the user terminal to a multicast box that is configured to relay data for the desired content from the content providing server to the user terminal, wherein the multicast box is not for providing the user terminal with an Internet connection;
   subsequent to receiving the command, communicating, by the user terminal, with the multicast box according to the command from the content providing server;
   in response to communicating, determining, by the user terminal, whether the data is available for multicasting at the local DSL device; and
   wherein if the data is available for multicasting at the local DSL device, the user terminal receives the data from the local DSL device, wherein if the data is not available form multicasting at the local DSL device, the user terminal receives the data from the multicast box via one-on-one connection.

7. The method of claim 6, further comprising:
   receiving, by the user terminal, a command from the multicast box to communicate with the local DSL device so as to obtain information for use in determining whether the local DSL device supports multicasting;
   in reply to the command from the multicast box, communicating with the local DSL device, by the user terminal, to receive a response from the local DSL device for use in determining whether the local DSL device supports multicasting.

8. The method of claim 6, wherein the user terminal downloads from the content providing server a computer program configured to enable the user terminal to communicate with the content providing server and the multicast box so as to receive the data from the multicast box.

9. A method of relaying data from a content providing server to a terminal connected to a DSL network, the method comprising:
   providing a multicast box configured to relay data from a content providing server to user terminals, wherein the multicast box is not for providing the user terminals with an Internet connection;
   receiving, by the multicast box, data for a content from a content providing server, wherein the data is for a content selected by a first user terminal via a local DSL device linking between the Internet and the first user terminal;
   subsequent to receiving the data, communicating, by the multicast box, with the first user terminal to determine whether a local DSL device supports multicasting; and
   transmitting, by the multicast box, the data to the first user terminal,
   wherein if the local DSL device supports multicasting, the data is transmitted via a multicasting address of the local DSL device,
   wherein if the local DSL device does not support multicasting, the data is transmitted via one-on-one connection.

10. The method of claim 9, wherein the data is available at the multicasting address for a second user terminal connected to the Internet via the local DSL device.

11. A method of relaying data from a content providing server to a terminal connected to a DSL network, the method comprising:
   providing a multicast box configured to relay data from a content providing server to user terminals, wherein the multicast box is not for providing the user terminals with an Internet connection;
   receiving, by the multicast box, data for a content from a content providing server, wherein the data is for a content selected by a first user terminal via a local DSL device linking between the Internet and the first user terminal;
   subsequent to receiving the data, communicating, by the multicast box, with the first user terminal to verify whether the local DSL device supports multicasting;
   receiving, by the multicast box, information indicative of whether the local DSL device supports multicasting;
   transmitting, by the multicast box, the data to the first user terminal;
   communicating, by the multicast box, with a second user terminal when the second user terminal is directed to a multicasting address of the multicast box upon the second user terminal's requesting of the content to the content providing server; and
   directing, by the multicast box, the second user terminal to the local DSL device if the local DSL device supports multicasting and further if the data is available for multicasting at a multicasting address of the local DSL device.

12. The method of claim 11, wherein if the local DSL device supports multicasting, wherein the data is further transmitted from the first user terminal to a multicasting address of the local DSL device.

13. The method of claim 11, wherein communicating with the first user terminal comprises sending to the first user terminal a command to determine whether the local DSL device supports multicasting.

* * * * *

UNITED STATES PATENT AND TRADEMARK OFFICE
CERTIFICATE OF CORRECTION

PATENT NO. : 7,580,978 B2  Page 1 of 1
APPLICATION NO. : 10/674848
DATED : August 25, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Fourteenth Day of September, 2010

David J. Kappos
*Director of the United States Patent and Trademark Office*